US009785135B2

United States Patent
(12) United States Patent
Shah

(10) Patent No.: US 9,785,135 B2
(45) Date of Patent: Oct. 10, 2017

(54) MULTIPLE ALTERNATIVE AUTOMATION INPUT SYSTEM AND METHOD

(71) Applicant: ROCKWELL AUTOMATION ASIA PACIFIC BUSINESS CENTER PTE. LTD., Singapore (SG)

(72) Inventor: Rajesh Ramesh Shah, Beachwood, OH (US)

(73) Assignee: Rockwell Automation Asia Pacific Business Center Pte. Ltd., Singapore (SG)

(*) Notice: Subject to any disclaimer, the term of this patent is extended or adjusted under 35 U.S.C. 154(b) by 511 days.

(21) Appl. No.: 14/253,602

(22) Filed: Apr. 15, 2014

(65) Prior Publication Data

US 2015/0134119 A1 May 14, 2015

(51) Int. Cl.
*G01M 1/38* (2006.01)
*G05B 19/042* (2006.01)

(52) U.S. Cl.
CPC .................... *G05B 19/0423* (2013.01); *G05B 2219/37427* (2013.01)

(58) Field of Classification Search
None
See application file for complete search history.

(56) References Cited

U.S. PATENT DOCUMENTS 5,415,839 A * 5/1995 Zaun .................... C12Q 1/6846 219/385
6,009,369 A * 12/1999 Boisvert .............. F02P 19/026 123/145 A
6,154,686 A * 11/2000 Hefferen .............. B08B 15/023 454/59
8,072,098 B2 12/2011 Elias et al.
2003/0033055 A1* 2/2003 McRae ................ A61M 11/041 700/266
2003/0225544 A1* 12/2003 Ismail ....................... G01P 5/12 702/136
2009/0085538 A1* 4/2009 Miguchi ................ H02M 3/07 323/273
2009/0146806 A1* 6/2009 Jensen .................. G01D 18/00 340/540
2010/0213890 A1* 8/2010 Winger ................ H02J 7/0047 320/106

(Continued)

FOREIGN PATENT DOCUMENTS

EP 2128579 A1 12/2009
JP 2012065536 A 3/2012

OTHER PUBLICATIONS

Extended EP Search Report Mailed Aug. 14, 2015.
Search Report for CN Application No. 201410645687.4 mailed Nov. 2, 2016, with English translation, 13 pages.

*Primary Examiner* — Adam Lee
(74) *Attorney, Agent, or Firm* — Fletcher Yoder P.C.

(57) ABSTRACT

Components and devices are provided for controlling and monitoring a machine or process using an automation controller that may be capable of receiving inputs from a digital source, an analog source, or a thermistor source. In one embodiment, an automation controller may include first, second, and third input terminals. The first and second input terminals may receive input signals from analog and digital sensors, and the second and third terminals may receive input signals from a thermistor.

17 Claims, 2 Drawing Sheets

(56) References Cited

U.S. PATENT DOCUMENTS

| | | | | |
|---|---|---|---|---|
| 2010/0256866 | A1* | 10/2010 | Toda | F02P 19/027<br>701/29.2 |
| 2012/0031985 | A1* | 2/2012 | Do | G05D 23/1928<br>236/46 A |
| 2012/0125078 | A1* | 5/2012 | Iott | E05F 15/443<br>73/1.82 |
| 2012/0133427 | A1* | 5/2012 | Kim | H01L 23/34<br>327/564 |
| 2012/0299689 | A1* | 11/2012 | Wang | H05B 1/0269<br>337/1 |
| 2013/0120178 | A1* | 5/2013 | Murakami | G01D 5/00<br>341/155 |
| 2015/0377676 | A1* | 12/2015 | Asano | G01F 1/684<br>73/861 |

* cited by examiner

MULTIPLE ALTERNATIVE AUTOMATION INPUT SYSTEM AND METHOD

CROSS-REFERENCE TO RELATED APPLICATIONS

This application claims the benefit of Singapore Patent Application No. 201308400-9, filed Nov. 12, 2013.

BACKGROUND

The disclosure relates generally to the field of automation control systems, such as those used in commercial or industrial settings. More particularly, embodiments of the present disclosure relate to techniques for an automation controller to receive inputs from varying types of input sources.

Automation controllers are special purpose computers used for controlling industrial automation and the like. Under the direction of stored programs, a processor of the automation controller examines a series of inputs (e.g., electrical input signals to the automation controller) reflecting the status of a controlled process and changes outputs (e.g., electrical output signals from the automation controller) based on analysis and logic for affecting control of the controlled process. The stored control programs may be continuously executed in a series of execution cycles, executed periodically, or executed based on events. The inputs received by the automation controller from the controlled process and the outputs transmitted by the automation controller to the controlled process are generally passed through one or more I/O devices, which are components of an automation control system that serve as an electrical interface between the automation controller and the controlled process. In some embodiments, however, the inputs and outputs of the automation controller may not need to pass through an I/O device. This may occur in smaller automation controllers that may have I/O capabilities already built into the controller.

Traditional automation controllers support both analog and digital inputs. The automation controllers provide a process to affect an input within a fixed time window in order to provide a desired output. However, other devices, such as thermistors, are not compatible as inputs to traditional automation controllers. For instance, because thermistors require a power source in order to properly function, a thermistor signal would have to run through another device before a signal sent out from the thermistor could be input into the automation controller. It is now recognized that it is advantageous to provide a more efficient method of inputting a thermistor signal into an automation controller. As such, an automation controller providing input capabilities for analog, digital, and thermistor inputs is desired.

BRIEF DESCRIPTION

In one embodiment, an automation component includes a first input terminal that may receive an input from an analog sensor or a digital sensor, a second input terminal that may receive an input from the analog sensor, the digital sensor or a thermistor, and a third input terminal that may receive an input from the thermistor.

In another embodiment, an automation controller may include first, second, and third input terminals, the first and second input terminals may receive input signals from analog and digital sensors, and the second and third terminals may receive input signals from a thermistor.

In yet another embodiment, an automation component may include a first input terminal that may receive an input from an analog sensor or a digital sensor, a second input terminal that may receive an input from the analog sensor, the digital sensor or a thermistor, a resistor may be coupled across the first and second input terminals, a third input terminal may receive an input from the thermistor, and a power supply that may be coupled to the third input terminal and may provide power to the thermistor when coupled to the third input terminal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
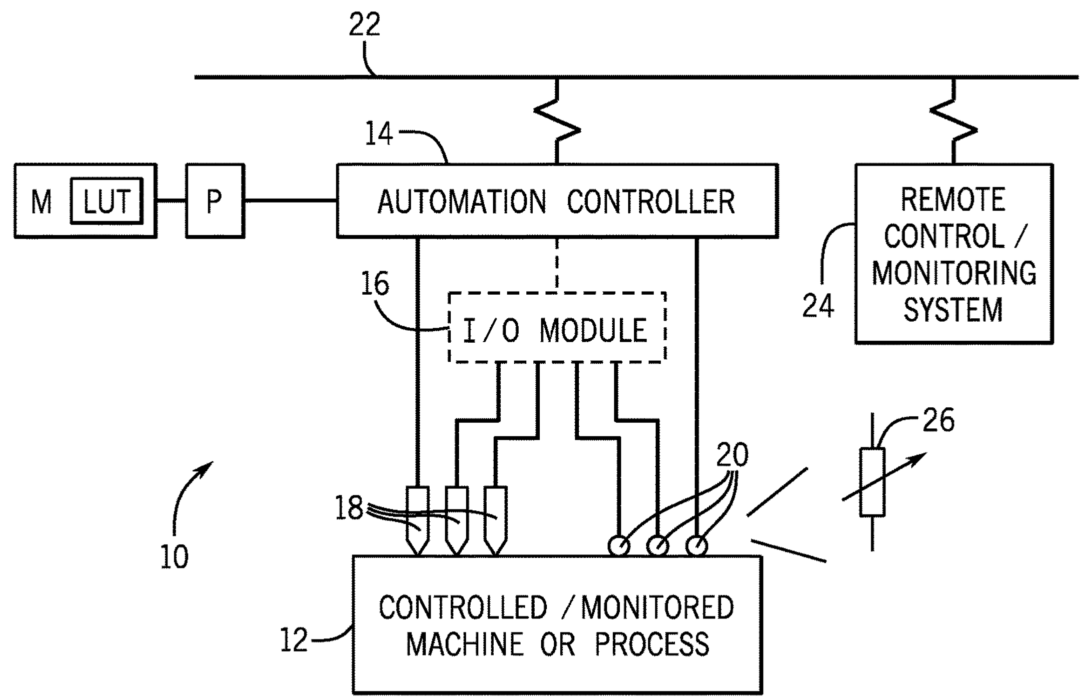
FIG. 1 is a diagrammatical representation of an automation controller system adapted to be compatible with analog, digital, and thermistor signal inputs, in accordance with embodiments of the present techniques.

FIG. 1 is a diagrammatical representation of an automation controller system 10. The automation controller system 10 may include a controlled and monitored machine or process 12 that is controlled by an automation controller 14. The controlled and monitored machine or process 12 may take many forms and include devices for accomplishing many different purposes. For example, the controlled and monitored machine or process 12 may comprise a heating, ventilation, and air conditioning (HVAC) unit, a compressor station, an oil refinery, a batch operation for making food items, a mechanized assembly line, and so forth. Accordingly, the controlled and monitored machine or process 12 may comprise a variety of operational components, such as electric motors, valves, actuators, temperature elements, pressure sensors, or a myriad of manufacturing, processing, material handling, and other applications. Further, the controlled and monitored machine or process 12 may comprise control and monitoring equipment for regulating process variables through automation and/or observation.

Additionally, in one embodiment, the controlled and monitored machine or process 12 may send output signals directly to an automation controller 14 and may receive input signals directly from the automation controller 14. In other embodiments, the controlled and monitored machine or process 12 may send output signals to the automation controller 14 via an input/output (I/O) module 16. Further, the controlled and monitored machine or process 12 may receive input signals from the automation controller 14 via the I/O module 16. The automation controller 14 may not require the I/O module 16 in order to interact with the controlled and monitored machine or process 12. In this situation, the connection between the automation controller 14 and the controlled and monitored machine or process 12 may be direct, or it may still occur through the I/O module 16.

For example, the illustrated controlled and monitored machine or process 12 comprises actuators 18 and sensors 20. The actuators 18 may include any number of devices adapted to perform a mechanical action in response to a signal from a controller (e.g., the automation controller 14). The sensors 20 may comprise any number of devices adapted to provide information regarding process conditions. The actuators 18 and the sensors 20 may be utilized to operate process equipment. Indeed, they may be utilized within process loops that are monitored and controlled by the automation controller 14. Such a process loop may be activated based on process inputs (e.g., input from a sensor 20) or direct operator input received through a network 22 originating from a remote control and monitoring system 24. Additionally, as indicated above, utilizing the actuators 18 and the sensors 20 may be accomplished through direct interaction with the automation controller 14. Further, utilizing the actuators 18 and the sensors 20 may also be accomplished by feeding the signals through the I/O module 16 and subsequently into the automation controller 14.

Furthermore, a thermistor 26 may be used as one of the sensors 20 in the automation control system 10 used to control a mechanism of the controlled and monitored machine or process 12. The thermistor 26 may be a type of resistor with a resistance that may vary depending on the temperature surrounding the thermistor 26. As such, the resistance of the thermistor 26 may either increase with a temperature increase or decrease with a temperature increase. For example, a thermistor 26 whose resistance increases upon an increase in temperature may be known as a positive temperature coefficient (PTC) thermistor, while a thermistor 26 whose resistance increases upon a decrease in temperature may be known as a negative temperature coefficient (NTC) thermistor. The automation controller 14 may be programmable to allow the use of both a PTC thermistor and an NTC thermistor.

Moreover, it may be noted that the automation controller 14 may include a processor P as shown in FIG. 1. The processor P, as mentioned above, may examine an input and determine what to output based on analysis and logic for affecting control of the controlled and monitored machine or process 12. When the thermistor 26 is providing the input to the automation controller 14, the processor P may consult a memory component M including a look-up table LUT. The memory M may store the look-up table LUT which may include resistance values of the thermistor 26 and a set of temperature values that may correspond to the resistance values. In this manner, the automation controller 14 may determine an appropriate output signal in order to interact with the actuators 18 and control the controlled and monitored machine or process 12.

For example, an embodiment of a look-up table LUT presented below in Table 1 may represent the relationship between the determined resistance of the thermistor 26 and the corresponding temperature values to that resistance 26. Table 1 is merely illustrative and is not intended as an exhaustive list of thermistor 26 look-up tables LUTs. Other thermistors 26 that have different look-up tables LUTs may also be utilized for the techniques described herein.

TABLE 1

Thermistor Resistance Temperature Look-Up Table

| Temp. (° C.) | Resistance (kΩ) |
|---|---|
| −40 | 328.996 |
| −35 | 237.387 |
| −30 | 173.185 |
| −25 | 127.773 |
| −20 | 95.327 |
| −15 | 71.746 |
| −10 | 54.564 |
| −5 | 41.813 |
| 0 | 32.330 |
| 5 | 25.194 |
| 10 | 19.785 |
| 15 | 15.651 |
| 20 | 12.468 |
| 25 | 10.000 |
| 30 | 8.072 |
| 35 | 6.556 |
| 40 | 5.356 |
| 45 | 4.401 |
| 50 | 3.635 |
| 55 | 3.019 |
| 60 | 2.521 |
| 65 | 2.115 |
| 70 | 1.781 |
| 75 | 1.509 |
| 80 | 1.284 |
| 85 | 1.097 |
| 90 | 0.941 |
| 95 | 0.810 |
| 100 | 0.701 |
| 105 | 0.608 |
| 110 | 0.530 |
| 115 | 0.463 |
| 120 | 0.406 |
| 125 | 0.358 |

Furthermore, in another embodiment, the processor P may perform an equation related to a particular type of thermistor 26 in order to determine the temperature value corresponding to the resistance value of the thermistor 26 measured at any given time. The equation that may be used by the processor to determine temperature from the resistance of the thermistor 26 may be a Steinhart-Hart equation. The Steinhart-Hart equation may be used to approximate temperature measurements of the thermistor 26. The equation may be presented as follows:

$$\frac{1}{T} = a + b\ln(R) + c\ln(R)^3 \tag{1}$$

Where T may be a temperature approximation, R may be the determined resistance of the thermistor 26, and a, b, and c may be constants depending on a particular thermistor 26.

Additionally, other equations used to approximate the temperature measurements may also be used.

Figure 2:
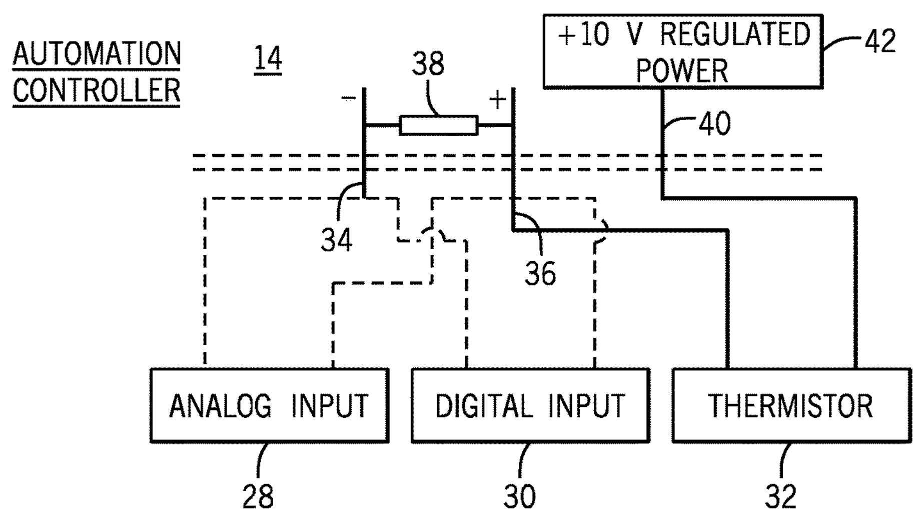
FIG. 2 is a circuit diagram representation of the automation controller with input paths from the analog, digital, and thermistor inputs, in accordance with embodiments of the present techniques.

Turning now to FIG. 2, a circuit diagram of the automation controller 14 is illustrated. The automation controller 14 may receive an analog input 28, a digital input 30, or a thermistor input 32 from the controlled and monitored machine or process 12 of FIG. 1. Moreover, the automation controller 14 may provide an output signal to the controlled and monitored machine or process 12 to control the machine or process 12. The analog input 28 and the digital input 30 may both share a negative terminal 34 on the automation controller 14. Further, the analog input 28, the digital input 30, and the thermistor input 32 may all share a positive terminal 36 on the automation controller 14. Additionally, there may be a resistor 38 within the automation controller 14 coupled to the positive terminal 36 on one end and the negative terminal 36 on the other end. Furthermore, the thermistor input 32 may couple to a +10V regulated power terminal 40. The +10V regulated power terminal 40 may be regulated to a +10V output by power circuitry 42. In other words, the thermistor 26 may be provided a constant DC power source in order for the automation controller 14 to determine a voltage drop across the thermistor 26. It may also be noted that the power circuitry 42 may provide many different voltages other than a +10V DC supply if the thermistor 26 functions using a different voltage. Moreover, the power circuitry 42 may include a voltage regulator, which may stabilize a DC power output of the +10V regulated power terminal 40. As such, the automation controller 14 may receive input from three different types of sources using no more than three terminals.

In at least one embodiment, the +10V regulated power terminal 40 may provide power for the thermistor 26 when the thermistor 26 is coupled to the +10V regulated power terminal 40 and the positive terminal 36. The resistance of the thermistor 26 may be determined by measuring the voltage drop across the thermistor 26. Once the voltage drop is determined, the following equation may be used to solve for the resistance of the thermistor 26:

$$R_T = \frac{R_{38} \cdot 10\text{ V}}{V_D} - R_{38} \tag{2}$$

where $V_D$ may be the voltage drop across the thermistor 26, $R_{38}$ may be a fixed resistance of the resistor 38, $R_T$ may be the resistance of the thermistor 26, and 10V may be the voltage output by the +10V regulated power terminal 40. As such, when the resistance of the thermistor 38 is determined, the resistance may be paired up with the corresponding temperature in the look-up table LUT of the memory M by the processor P.

Additionally, the automation controller 14 may receive input from both PTC thermistors and NTC thermistors. Depending on which type of thermistor 26 is providing input into the automation controller 14, the processor of the automation controller may be able to consult one of several look-up tables stored in the memory M of the automation controller 14 that may correspond to the specific thermistor 26. In this manner, the automation controller 14 may provide accurate temperature control to the controlled and monitored machine or process 12 when receiving the thermistor inputs 32 from several different types of the thermistors 26.

Further, to accurately measure the thermistor input 32, the automation controller 14 may be calibrated. Calibration of the automation controller 14 for a thermistor input 32 may be accomplished by shorting a wire around the thermistor 26 between positive terminal 36 and +10V regulated power terminal 40. In another embodiment, a wire may be used as the only input into positive terminal 36 and +10V regulated power terminal 40 (i.e., without the thermistor 26) during calibration of the automation controller 14. A resistance value measured across a short may enable the automation controller 14 to be calibrated. Accordingly, the measured resistance of the short may be subtracted from the resistance of the thermistor input 32 by the processor of the automation controller 14 prior to consulting the look-up table to determine the corresponding temperature.

In another embodiment, the automation controller 14 may be used to measure a resistance of a resistor coupled across positive terminal 36 and +10V regulated power terminal 42. In a similar manner to determining the resistance of thermistor 26, the processor of the automation controller 14 may determine the resistance of the resistor by measuring a voltage drop from the +10V regulated power terminal 42 to the positive terminal 36. The processor may then carry out equation 2 above where $R_T$ may represent the resistance of the resistor rather than the resistance of the thermistor 26. In this manner, the automation controller 14 may function as an ohmmeter.

Further, calibration of the ohmmeter function of the automation controller 14 may similarly be accomplished using a short across positive terminal 36 and +10V regulated power terminal 42. The short may take place parallel to a resistor already in place, or the short may be the only input into the terminals 36 and 42. As discussed above, a resistance measured across the short may be subtracted by the processor of the automation controller 14 from a measured resistance of the resistor coupled between the positive terminal 36 and the +10V regulated power terminal 42. Moreover, equation 2 may again be used to determine the resistance of the short, where $R_T$ may represent the resistance of the short.

Furthermore, in yet another embodiment, an active sensor (e.g. an active pressure sensor) providing either analog input 28 or digital input 30 to the automation controller 14 may be powered by a constant DC power source. In this embodiment, the active sensor may use the +10V regulated power terminal 40 as the constant DC power source. As such, the active sensor may make use of all three terminals 34, 36, and 40 of the automation controller 14.

Figure 3:
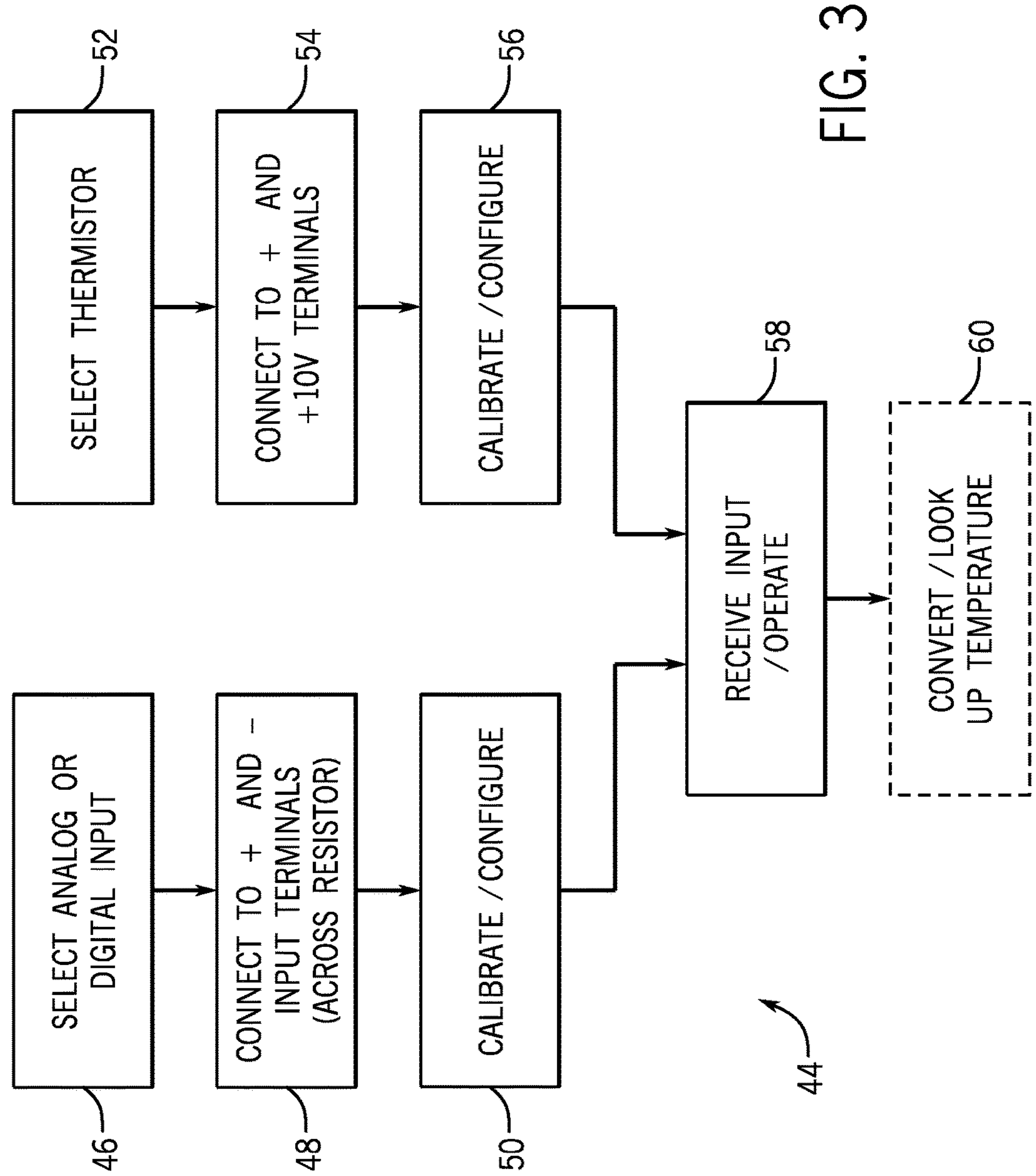
FIG. 3 is a flow chart diagram of exemplary steps or logic associated with the automation controller, in accordance with embodiments of the present techniques.

FIG. 3 illustrates the exemplary steps or logic 44 of the automation controller 14 interacting with the analog inputs 28, the digital inputs 30, or the thermistor inputs 32. Initially, a type of input may be selected for the automation controller 14 to receive. Selecting between the analog input 28 and the digital input 30 may occur at block 46. Further, the steps or logic 44 for the analog input 28 and the digital input 30 may be discussed together because the two inputs 28 and 30 may each use the positive terminal 36 and the negative terminal 34 of the automation controller 14. As such, the input type may be selected for the automation controller 14 to determine an appropriate output in response to the input.

After selecting whether the input may be analog or digital, the analog input 28 or the digital input 30 may be connected across the resistor 38 to the positive terminal 36 and the negative terminal 34 in block 48. As mentioned above, both the analog input 28 and the digital input 30 may use both the positive terminal 36 and the negative terminal 34 of the automation controller 14. For this reason, the automation controller 14 may be programmable through a software program (e.g., Connected Components Workbench™) in order to program the type of input that the automation controller 14 may receive.

Subsequently, the software program may be capable of calibrating or configuring the input that the automation controller 14 receives in block 50. For the analog input 28, the software program may be capable of setting an input gain and an input offset. Manipulating the input gain or the input offset may allow for the calibration of the input signal by either adding or eliminating gains or offsets in order to eliminate any gain or offset errors from the input. Further, for the digital input 30, the software program may set threshold values or hysteresis values that may limit errors due to noise in the digital input 30.

Turning now to the thermistor input 32, a thermistor 26 is selected as the input to the automation controller in block 52. Because the thermistor input 32 may be between the positive terminal 36 and the +10V regulated power terminal 40, the thermistor 26 may only use one terminal in common with the analog input 28 and the digital input 30. This may allow the automation controller 14 to determine that thermistor input 32 is being received when only the positive terminal 36 and the +10V regulated terminal 40 are in use.

Next, the thermistor 26 may be connected to the positive terminal 36 and the +10V regulated power terminal 40 in block 54. It may also be noted that in some embodiments, the thermistor 26 may be replaced by a resistor if the automation controller 14 may be used as the ohmmeter mentioned above. Further, the automation controller 14 may be calibrated or configured in block 56. Accordingly, the automation controller 14 may be calibrated for the thermistor input 32 through the short mentioned above between the positive terminal 36 and the +10V regulated power terminal 40. The calibration or configuration may be accomplished using the software program that also may configure and calibrate the analog or digital inputs 28 or 30 in block 50. The software program may calibrate the thermistor input 32 using a function block within the software program. Accordingly, the function block may be programmed to receive a resistance measurement for the short across the thermistor 26 terminals and provide the automation controller 14 with the appropriate calibration which may limit resistance errors in the thermistor input 32.

After the calibration and configuration may be accomplished in blocks 50 or 56, the automation controller 14 may receive the input in order to determine what operation may occur when controlling the machine or process 12 in block 58. For an analog input 28 or a digital input 30, the automation controller 14 may receive the input and output an operation command based on the input. On the other hand, the automation controller 14 when receiving the thermistor input 32 may use an extra step to determine an appropriate operation command based on the thermistor input 32. For example, the automation controller 14 may convert the thermistor input 32 into a resistance of the thermistor 26 and consult a look-up table in the memory of the automation controller 14 in order to assign a temperature to the resistance in block 60. Block 60 may allow the automation controller 14 to determine the appropriate operation command for the controlled and monitored machine or process 12 based on the temperature corresponding to the thermistor input 32.

Further, while the automation controller may function as the ohmmeter discussed above using the thermistor input 32 with a resistor, the automation controller 14 may receive an input and operate by sending a determined resistance value to be displayed on the remote control and monitoring system 24. In a similar manner, the automation controller 14 may provide the remote control and monitoring system 24 with a live feed of the temperature observed by the thermistor 26. As such, a user may constantly or intermittently monitor the controlled and monitored machine or process 12 for temperature anomalies.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation component system comprising:
an automation component comprising:
a processor and a memory;
a first input terminal configured to
receive a first input from an analog sensor when the analog sensor is coupled to the first terminal, and
receive the first input from a digital sensor when the digital sensor is coupled to the first terminal;
a second input terminal configured to
receive a second input from the analog sensor when the analog sensor is coupled to the second terminal,
receive the second input from the digital sensor when the digital sensor is coupled to the second terminal, and
receive the second input from a thermistor when the thermistor is coupled to the second terminal; and
a third input terminal configured to receive a third input from the thermistor, wherein in operation the automation component is coupled to a machine and controls the machine.

2. The automation component system of claim 1, wherein the memory comprises a look up table.

3. The automation component system of claim 2, wherein the automation component converts the signals received from the thermistor coupled to the second and third input terminals to a temperature value by reference to the stored look up table.

4. The automation component system of claim 1, wherein the automation component comprises a resistor coupled across the first and second input terminals.

5. The automation component system of claim 1, wherein the automation component comprises a power supply coupled to the third input terminal and configured to provide power to the thermistor when coupled to the third input terminal.

6. The automation component system of claim 5, wherein the power supply provides 10V regulated power for operation of the thermistor.

7. The automation component system of claim 1, wherein the automation component is configured to convert signals received from the thermistor coupled to the second and third input terminals to a temperature value.

8. The automation component system of claim 7, wherein the temperature value is between −40 and 155 degrees C.

9. The automation component system of claim 7, wherein the automation component converts the signals received from the thermistor using an approximation equation to calculate an approximation of the temperature value.

10. The automation component system of claim 1, wherein the automation component is configured to be coupled to the analog sensor, the digital sensor or the thermistor through an input/output module.

11. The automation controller component system of claim 1, wherein the inputs are configurable and calibrated through an automation controller software program.

12. The automation component system of claim 11, wherein a gain or an offset for the inputs is established using the automation controller software program.

13. The automation component system of claim 11, wherein the automation controller software program configures the automation component to measure a resistance of a resistor coupled across the first and second input terminals.

14. The automation component system of claim 1 comprising a remote control monitoring system connected to the automation component via a network.

15. The automation component system of claim 1, wherein the automation component is configured to receive input signals from the thermistor and control the machine using the input signals from the thermistor, and wherein the machine is a heating, ventilation, and air conditioning (HVAC) system.

16. The automation component system of claim 1, wherein the thermistor input is calibrated by creating a short across from the second input terminal to the third input terminal, determining a resistance of the short, and subtracting the resistance of the short from a resistance of the thermistor.

17. The automation component system of claim 1, wherein the second input terminal and the third input terminal are configured to receive input from both a positive temperature coefficient thermistor and a negative temperature coefficient thermistor.

* * * * *